Dec. 4, 1951 C. W. CHILLSON 2,577,604

PROPELLER PITCH CHANGING MECHANISM

Filed July 23, 1947 11 Sheets-Sheet 1

Inventor
Charles W. Chillson
By Godfrey B. Speir
Attorney

Dec. 4, 1951 C. W. CHILLSON 2,577,604

PROPELLER PITCH CHANGING MECHANISM

Filed July 23, 1947 11 Sheets-Sheet 2

Inventor

Charles W. Chillson

By Godfrey B. Speir

Attorney

Inventor
Charles W. Chillson
By Godfrey B. Speir
Attorney

Dec. 4, 1951 C. W. CHILLSON 2,577,604

PROPELLER PITCH CHANGING MECHANISM

Filed July 23, 1947 11 Sheets-Sheet 4

INVENTOR.
Charles W. Chillson

BY Godfrey B. Speir

ATTORNEY.

Dec. 4, 1951 C. W. CHILLSON 2,577,604

PROPELLER PITCH CHANGING MECHANISM

Filed July 23, 1947 11 Sheets-Sheet 5

INVENTOR.
Charles W. Chillson
BY Godfrey B. Speir
ATTORNEY

Dec. 4, 1951 C. W. CHILLSON 2,577,604

PROPELLER PITCH CHANGING MECHANISM

Filed July 23, 1947 11 Sheets-Sheet 6

INVENTOR.
Charles W. Chillson
BY
Godfrey B. Speir
ATTORNEY

Dec. 4, 1951 C. W. CHILLSON 2,577,604

PROPELLER PITCH CHANGING MECHANISM

Filed July 23, 1947 11 Sheets-Sheet 7

INVENTOR.

Charles W. Chillson

BY Godfrey B. Speir

ATTORNEY

Dec. 4, 1951 C. W. CHILLSON 2,577,604

PROPELLER PITCH CHANGING MECHANISM

Filed July 23, 1947 11 Sheets-Sheet 8

INVENTOR.
Charles W. Chillson
BY Godfrey B. Speir
ATTORNEY

Dec. 4, 1951 C. W. CHILLSON 2,577,604

PROPELLER PITCH CHANGING MECHANISM

Filed July 23, 1947 11 Sheets-Sheet 9

INVENTOR.

Charles W. Chillson

BY Godfrey B. Speir

ATTORNEYS

Dec. 4, 1951 C. W. CHILLSON 2,577,604

PROPELLER PITCH CHANGING MECHANISM

Filed July 23, 1947 11 Sheets-Sheet 10

INVENTOR.
CHARLES W. CHILLSON

BY Godfrey B. Speir

ATTORNEY

PROPELLER PITCH CHANGING MECHANISM

Filed July 23, 1947 11 Sheets-Sheet 11

INVENTOR.
Charles W. Chillson
BY Godfrey B. Speir
ATTORNEY.

Patented Dec. 4, 1951 2,577,604

UNITED STATES PATENT OFFICE 2,577,604

PROPELLER PITCH CHANGING MECHANISM

Charles W. Chillson, Caldwell, N. J., assignor to Curtiss-Wright Corporation, a corporation of Delaware Application July 23, 1947, Serial No. 762,853

6 Claims. (Cl. 170—160.28)

This invention relates to variable pitch propellers and more particularly to propellers in which power for pitch change is primarily derived from the propeller drive shaft.

In variable pitch propellers for aircraft, the forces resisting the changing of pitch of the propeller blades, for example aerodynamic twisting moments, centrifugal twisting moments and friction are of sufficient magnitude to require a large amount of power where rapid change of pitch is desired. Where the propeller pitch is to be reversed as for braking purposes, it is desirable that the pitch reversal take place in a relatively short interval of time, since the propeller in approaching zero or flat pitch relieves the prime mover momentarily of substantially its entire load, thereby providing an opportunity for overspeeding. A propeller which is adapted to operate in reverse pitch as a brake may through pitch variation, control the speed of its driving prime mover, and the rate of pitch change for such control is necessarily preferably slow. Propellers operating in reverse pitch when employed to control prime mover speed through pitch variation exhibit a high degree of sensitivity; that is, a relatively small pitch change may effect a great change in engine loading. Consequently, the rate of pitch change of a propeller in reverse pitch while braking may to advantage be made at a speed much less than that employed for speed governing purposes in the positive range. Very fast change of pitch is desirable for the purpose of feathering a propeller quickly in the event the prime mover should fail as a source of power.

It is accordingly an object of the present invention to provide a variable pitch propeller wherein pitch change power is mechanically derived from the propeller drive shaft and in which the power so derived may be delivered to the propeller for pitch increase or decrease at varying rates of speed selectable at will.

Another object of the invention is to provide in a mechanism of the aforesaid type a structural arrangement of the parts such that the gearing adapted to derive power from the propeller shaft is arranged laterally of and around the drive shaft, so that inspection and replacement may not require dismantling of the propeller or its drive shaft.

A further object of the invention is to provide in a mechanism of the type described a dual planetary gear train arranged laterally of the propeller shaft by means of which power may be derived from the propeller shaft and delivered to the propeller pitch changing mechanism to increase or decrease pitch at varying rates of speed.

Still another object of the invention is to provide a mechanical variable pitch propeller in which pitch varying power or holding torque is continuously transmitted during propeller operation.

The above and other novel features of the invention will appear more fully hereinafter from the following detailed description when taken in conjunction with the accompanying drawings. It is expressly understood, however, that the drawings are employed for purposes of illustration only and are not designed as a definition of the limits of the invention, reference being had for this purpose to the appended claims.

In the drawings, wherein like reference characters indicate like parts,

Figure 1:
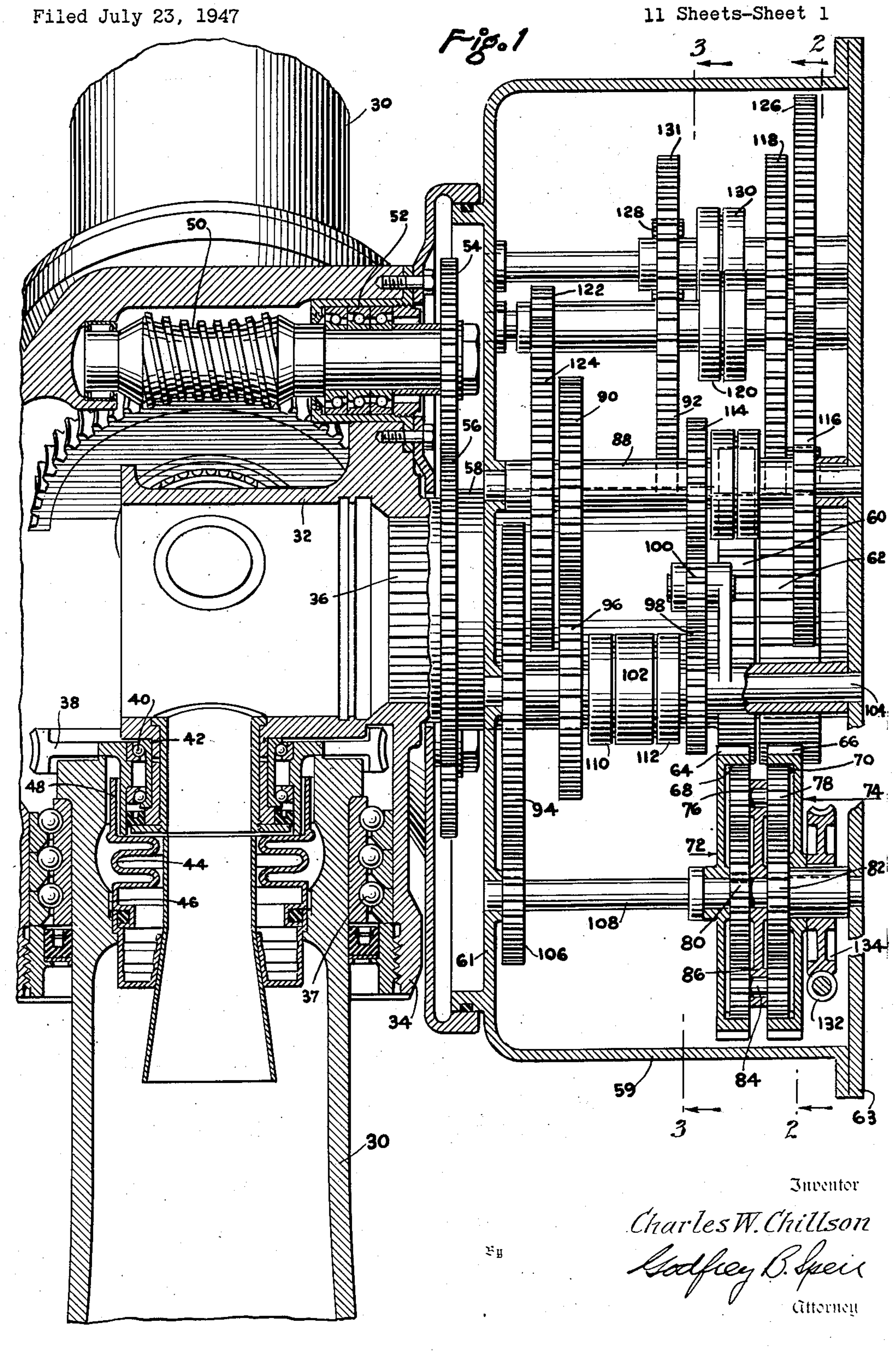
Fig. 1 is a side elevation of a propeller having one form of pitch changing mechanism, with parts thereof shown in section.
Figure 2:
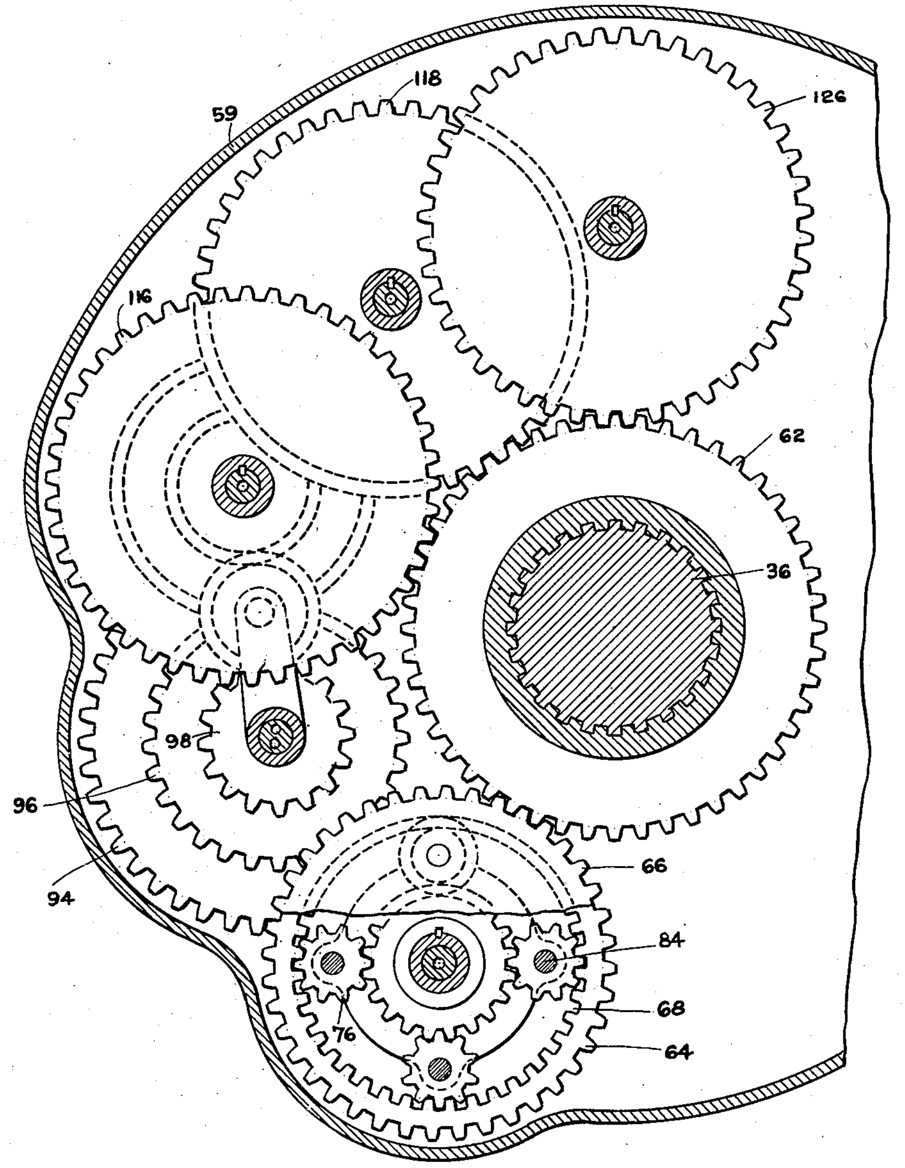
Fig. 2 is a section taken substantially on the line 2—2 of Fig. 1.
Figure 3:
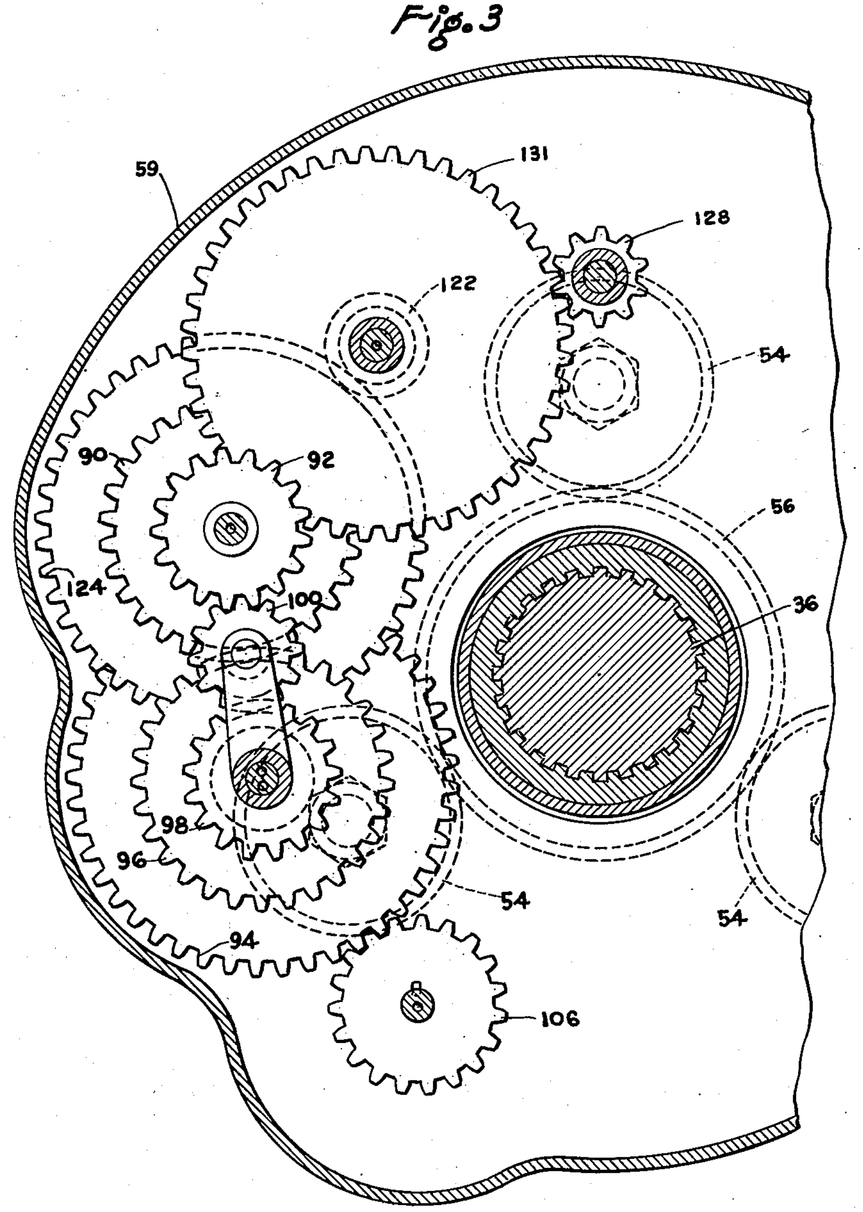
Fig. 3 is a section taken substantially on the line 3—3 of Fig. 1.
Figure 4:
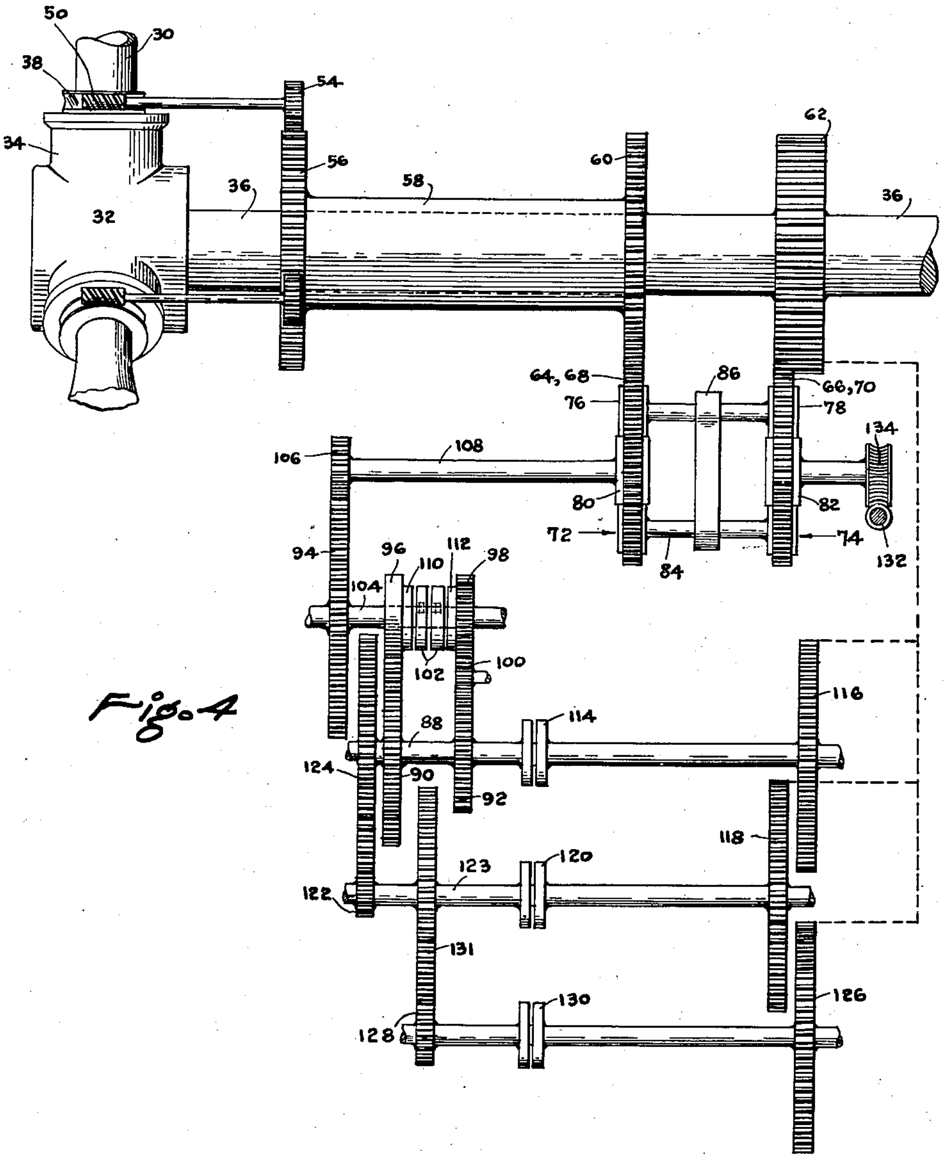
Fig. 4 is a schematic diagram of the gear trains of the modification of Figs. 1–4, laid out in a plane.

Referring to Figs. 1 through 4 wherein a preferred form of the invention is disclosed, there is shown a propeller having blades 30 mounted within a hub 32 having blade sockets 34 and a splined engagement with a drive shaft 36. The blades are mounted within the sockets 34 upon split thrust bearings 37 and are adapted to be turned by blade worm gear or wheel sectors 38 journalled on bearings 40 mounted around integral hub bosses 42. A laterally flexible torsion transmitting sleeve 44 splined to the blade as at 46, and to the blade gear as at 48 is adapted to transmit turning moments between the blade worm gear 38 and blade while relieving the gear 38 of stresses resulting from blade deflection in operation, off alinement from the axes of the retention or thrust bearings 40. The worm wheels 38 are driven by hour-glass worms 50 arranged parallel to the axis of rotation of the hub. Each of the worms is provided with bearings 52 maintaining position and alignment of the worm with respect to its mating worm wheel and each worm is provided with a spur gear 54 engaging a common sleeve gear 56 concentric with the propeller shaft and integrally formed or secured to a propeller pitch changing sleeve 58.

It will appear from the construction thus described that rotation of the sleeve 58 and its gear 56 relative to the propeller shaft in one direction or the other will effect changes in pitch of all the blades in unison. It will also appear that if the sleeve 58 be enforced to rotate at the same speed as the propeller shaft that the pitch of all the blades cannot change.

In order to secure the desired rotation of the sleeve 58 relative to the propeller shaft to effect changes in pitch or to fix the sleeve against rotation relative to the hub, mechanism including planetary gear trains mounted within a housing 59, having forward and rear walls 61 and 63, is employed to enforce movement of the sleeve relative to or with the shaft as may be desired. For this purpose, the sleeve is provided with a spur gear 60 and the shaft 36 is provided with a power gear 62 keyed thereon. Meshing with each of the gears 60 and 62 are spur gears 64 and 66 having internal gear teeth 68 and 70 forming part of planetary gear trains 72 and 74. The internal gears 68 and 70 mesh with a plurality of planet gears 76 and 78 which in turn revolve about sun gears 80 and 82. The planet gears 76 and 78 while relatively rotatable with respect to one another, are mounted upon common shafts 84 carried in a common spider 86.

It will appear from a consideration of the planetary gear trains 72 and 74 that upon the sun gears 80 and 82 being locked against relative rotation, the spur gears 64 and 66 will rotate in unison and force the sleeve gear 60 to rotate at the same speed as the power gear 62. However, if there be established relative rotation in one direction or another between the sun gears 80 and 82, then relative motion between the spur gears 64 and 66 will occur causing relative motion between the sleeve gear 60 and the power gear 62, which motion will thereby effect an increase or decrease in pitch depending upon the direction of relative movement between the sun gears 80 and 82. In the modification shown, the sun gear 82 is normally fixed against rotation and the sun gear 80 is so arranged that it may be fixed, or driven in either direction at one of three different speeds. The sun gear 80 is fixed to a shaft 108 and a gear 106, the latter being driven by a gear 94 on a lay shaft 104. Free to rotate on the shaft 104 are gears 96 and 98 which are jointly or individually clutchable to the shaft 104 by means of hydraulically actuated disc clutches 110 and 112, said units comprising clutch elements 102 keyed to the shaft 104. A shaft 88, which may be driven at three different speeds as will be described, is provided with a gear 90 driving the gear 96 and with a gear 92 driving the gear 98 through a reversing idler 100 interposed therebetween. With the shaft 88 not driven, both clutches 110 and 112 may be locked, thereby locking the shaft 104 from rotation due to locking of the gear train 96, 90, 92, 100 and 98. Then, through the gear connection 94, 106, the sun gear 80 is locked from rotation. If the shaft 88 is driven in one direction, regardless of speed, locking of either clutch 110 or 112 will produce turning of the gear 94 and thus of the sun gear 80, in forward or reverse directions whereby to effect blade pitch changes.

Power may be applied to the shaft 88 for driving the sun gear 80 by coupling the shaft through a hydraulic disc clutch or other suitable means 114 to a gear 116 meshing with the power gear 62. If it be desired to drive the shaft 88 at a lower speed than that provided by the gear 116 acting through the clutch 114, additional gear trains may be introduced to provide lower speeds. For this purpose a gear 118, also meshing with the power gear 62, may be coupled through a clutch 120 to a pinion 122 on a shaft 123 meshing with a gear 124 on shaft 88. In order to drive the shaft 88 at a still lower speed, gear 126, meshing with the power gear 62, may be caused to drive a pinion 128 through a selective clutch 130 and to thereby drive a gear 131 on the shaft 123 which then drives the shaft 88 through gears 122 and 124.

By selectively engaging either of clutches 110 or 112 and any one of clutches 114, 120 and 130, the pitch of the propeller blades may be varied in one direction or the other at any one of three speeds. It will also appear that if clutches 110 and 112 be simultaneously engaged while the clutches 114, 120 and 130 are disengaged, the gears 90, 92, 100 and 96 and 98 will be locked against rotation, thereby locking gear 94, its meshing gear 106 and the sun gear 80. By this means, the pitch of the propeller blades may be fixed against change.

During the operation previously described, the sun gear 82 has been held against rotation. Under circumstances requiring feathering or unfeathering of the propeller and when the propeller shaft is not rotating, it is necessary to employ an auxiliary source of power for effecting pitch changes. Such an auxiliary source of power may be introduced through the sun gear 82 by a driven worm 132 engaging a worm wheel 134 keyed for rotation with the sun gear 82. The auxiliary source of power may be an electric motor (not shown) drivably connected to the worm 132.

Figure 5:
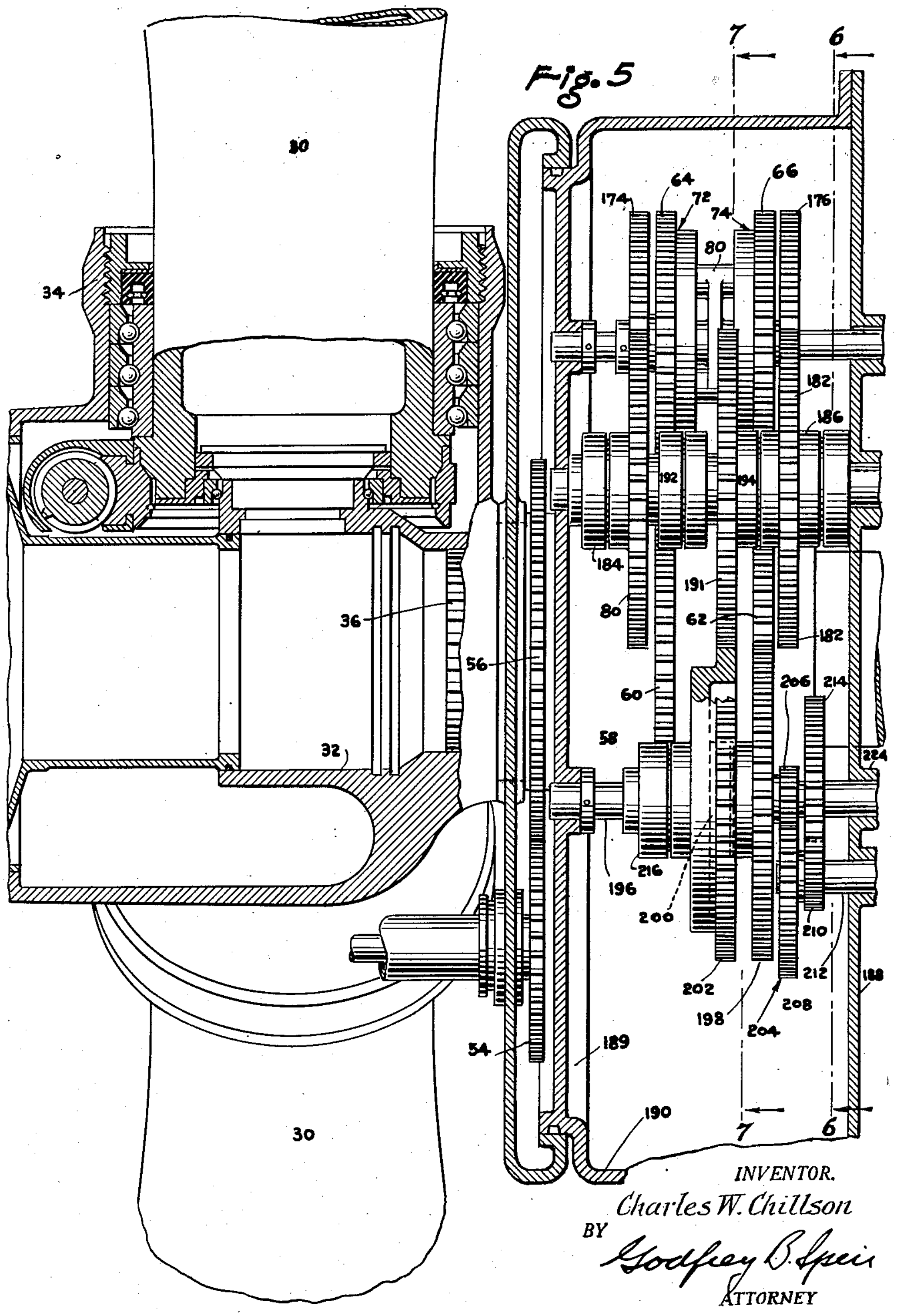
Fig. 5 is a side elevation of a propeller partly in section showing a modified form of pitch changing mechanism.
Figure 6:
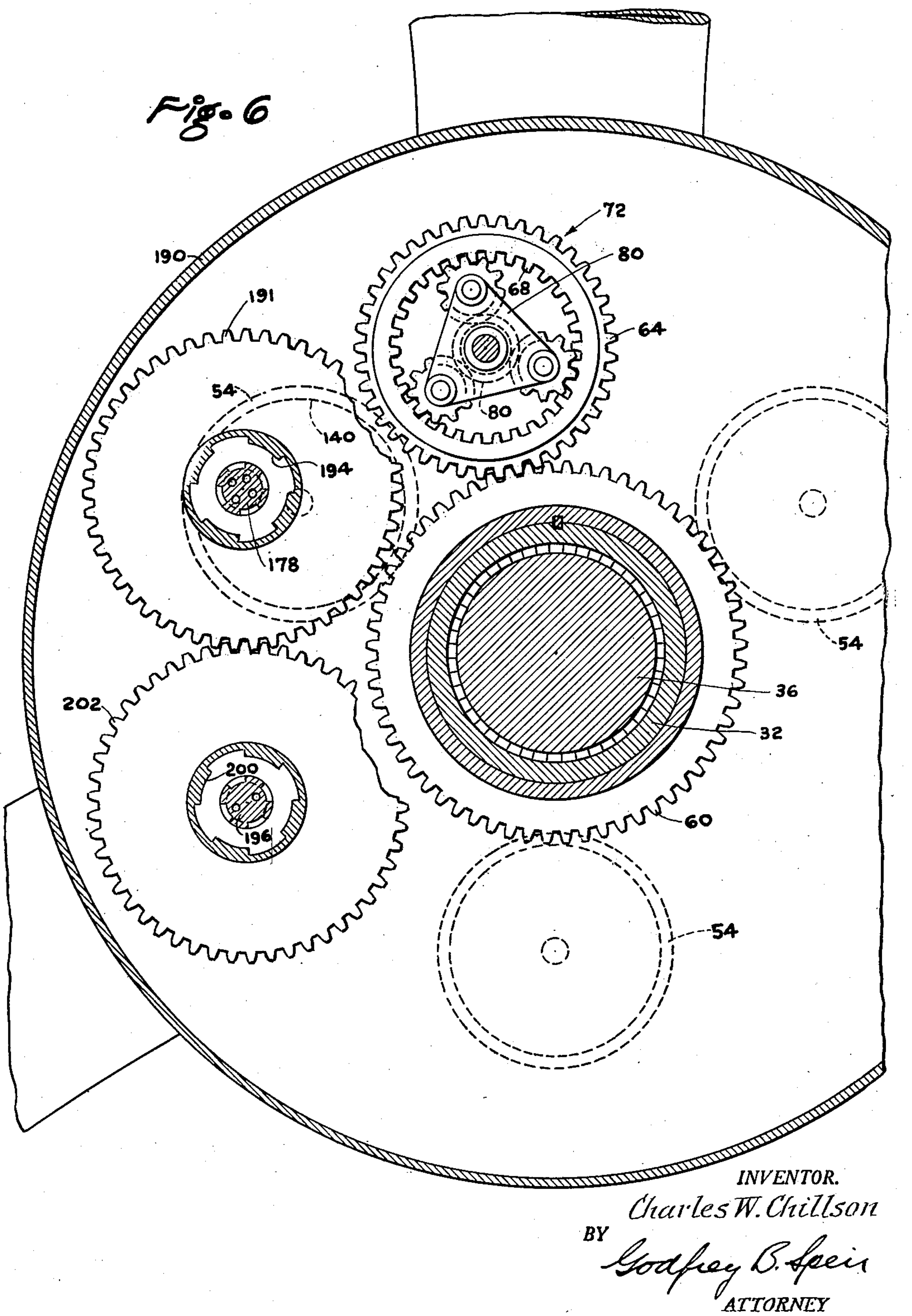
Fig. 6 is a section taken substantially on the line 6—6 of Fig. 5.
Figure 7:
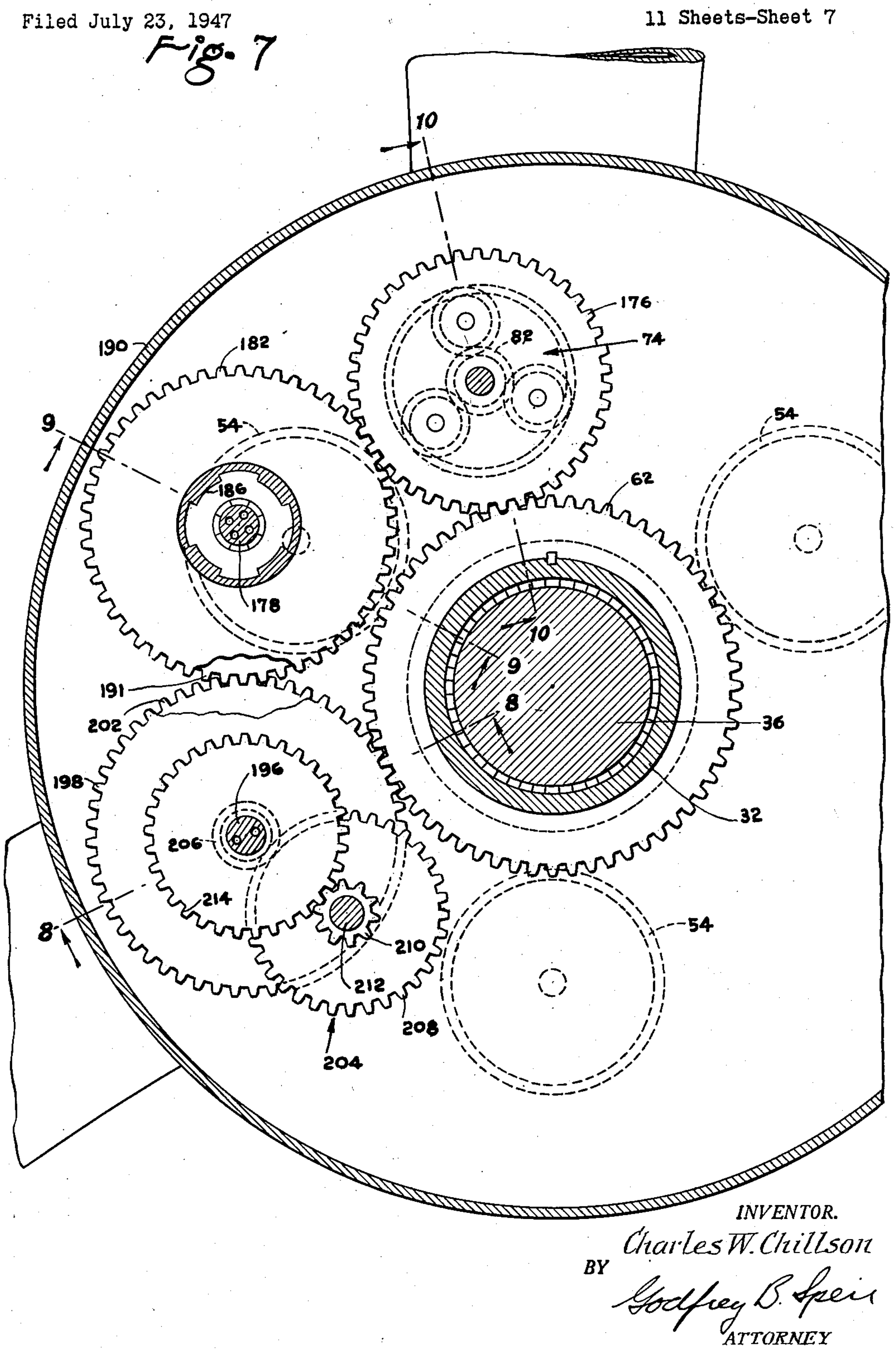
Fig. 7 is a section taken substantially on the line 7—7 of Fig. 5.

In the modification of the invention shown in Fig. 5, a somewhat different propeller hub structure is shown, the structural details of which appear in a co-pending application Serial No. 675,383 filed June 8, 1946. Each of the propeller blades is swivelly mounted and provided with a driving train driven by gears 54 which are driven in unison by a propeller shaft concentric sleeve gear 56. As in the previous modification, rotation of the sleeve gear relative to the propeller shaft 36 or hub 32 splined thereto will effect an increase or decrease in pitch depending on the relative direction of rotation. By securing the sleeve gear 56 against relative rotation with respect to the shaft 36, the pitch of the propeller blades is fixed. As in the previous modification, the sleeve gear 56 is carried on a sleeve 58 having a gear 60. The drive shaft 36 and the hub 32 splined thereon is provided with a power gear 62 keyed or otherwise secured for rotation with the propeller shaft 36. Meshing with the power gear 62 and the sleeve gear 60 are spur gears 64 and 66 formed externally on the rims of internal gears 68 and 70 of a pair of similar planetary gear trains 72 and 74. Each of these gear trains has planet gears 76 and 78 and sun gears 80 and 82. The planet gears 76 and 78 are rotatable relative to one another but are carried upon a common spider 86.

As in the previous modification, it will appear that variation in pitch may be effected by relative rotation of the sun gears 80 and 82. The sun gears 80 and 82 of the planetary sets 72 and 74 are provided with control gears 174 and 176 respectively.

On a lay shaft 178 spaced from and parallel to the axis of the planetary gear trains 72 and 74 are a pair of gears 180 and 182 meshing with control gears 174 and 176. Each of the gears 180 and 182 is adapted to be held against rotation through engagement of hydraulic brakes 184 and 186 which react against the end housing plates 188 and 189 of the casing 190. A third gear 191 rotatably mounted upon the lay shaft 178 is adapted to be clutched to either gear 180 or 182 through hydraulic clutches 192 and 194 disposed between gear 191, and 180 and 182 respectively.

Mechanism is provided for driving the gear 191 at two different speeds so that by applying either of the brakes 184 or 186 and actuating one of the clutches 192 or 194 so as to couple the unbraked gear of gears 180 or 182 to the intermediate gear 191, movement of the propeller pitch changing gear sleeve 58 relative to the hub and shaft is effected. Such gearing is provided on a third rotatable lay shaft 196 having a gear 198 journalled thereon meshed with the power gear 62. Through a hydraulic clutch 200, the gear 198 may be coupled to a drive gear 202 normally freely rotatable on the shaft 196, which is meshed with the intermediate gear 191 on the lay shaft 178 which drives said gear 191 at one speed. To provide a different speed for rotating the gear 202 from the power gear 150, a speed reducing back gear train 204 is arranged upon an auxiliary spindle 212. The back gear train comprises a pinion 206 fixed for rotation with gear 198 and a meshing gear 208 secured to a pinion 210, both rotatable with or on the shaft 212. A gear 214 keyed to the shaft 196 and meshing with the pinion 210 completes the back gear train. Through a second clutch 216, the shaft 196 and the gear 214 may be coupled to the gear 202, enforcing drive of the latter through the back gear train at reduced speed.

Figures 8, 9, 10:
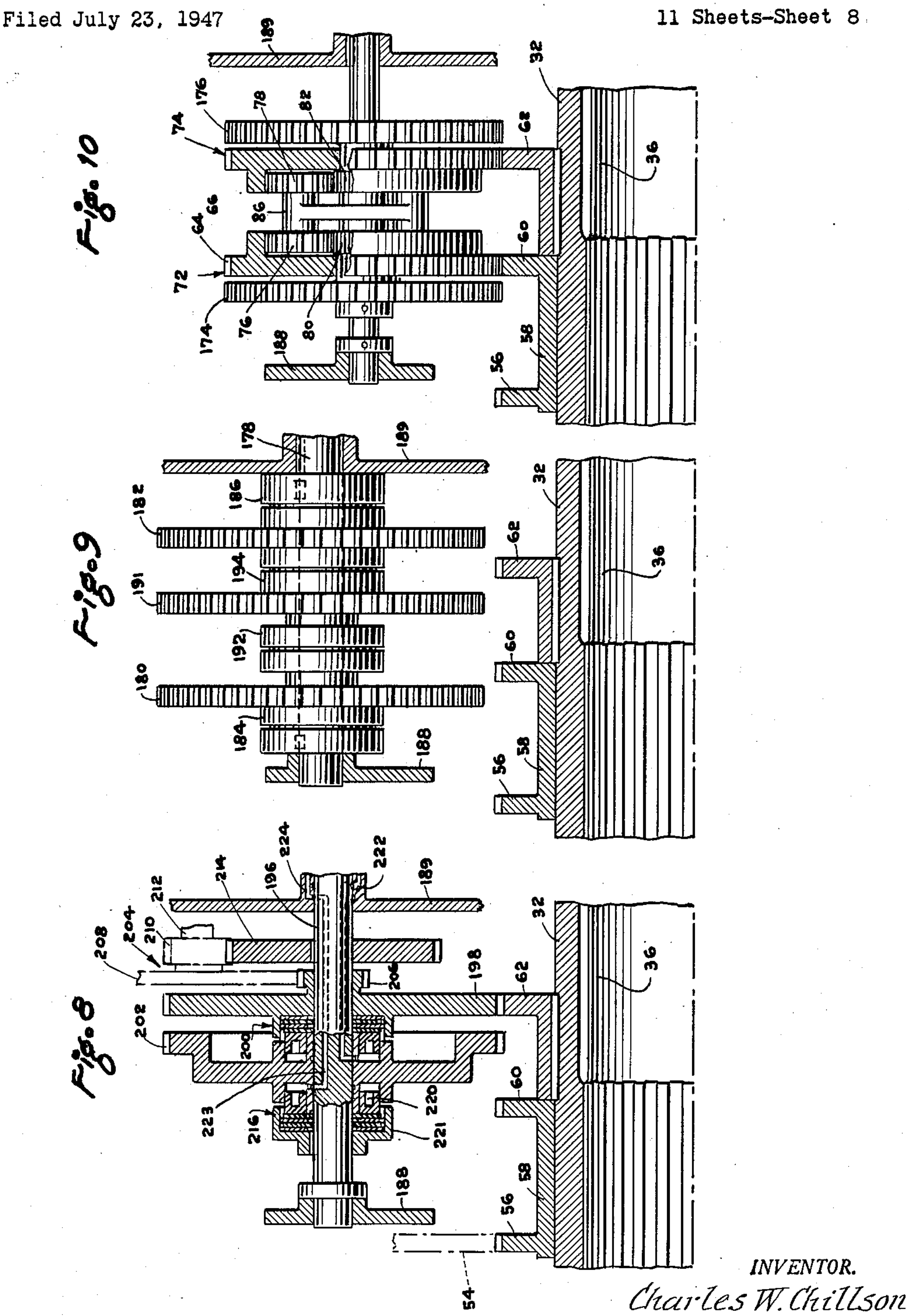
Fig. 8 is a longitudinal section taken through a lay shaft substantially on the line 8—8 of Fig. 6.
Fig. 9 is a section taken on another lay shaft substantially on the line 9—9 of Fig. 6.
Fig. 10 is a section taken on another lay shaft substantially on the line 10—10 of Fig. 6.

It will be understood that the various clutches described in the three modifications herein disclosed may be of any type capable of carrying the requisite torque and load requirements. The clutches may consist of multiple discs having alternating inner and outer lugs splined to the relatively rotatable parts. The engagement of the discs is effected by an annular piston such as 220 (Fig. 8) axially movable within an annular cylinder 221 having port connections to a conduit 223 extending longitudinally through the shaft. Where the shaft rotates as does the lay shaft in Fig. 8, additional fluid transfer means 222 are required between the frame bearing 224 and the shaft 196. Each of the hydraulic clutches may embody the features of the hydraulic clutches disclosed in the previously referred to co-pending application Serial No. 675,383 filed June 8, 1946.

From the foregoing description, it will be seen that the pitch of the propeller blades may be fixed or varied in either direction at two different speeds. In order to fix pitch, clutches 184 and 186 are applied. In order to increase pitch, clutch 186 may be applied and clutch 192 applied, and in addition one of the clutches 200 or 216 depending on whether fast or slow rate of pitch change is desired. If pitch decrease is desired, then the brake 184 will be actuated to hold gear 180 and clutch 194 and either one of clutches 200 or 216 will be actuated depending on whether a fast or slow rate of pitch decrease is desired.

Figure 12:
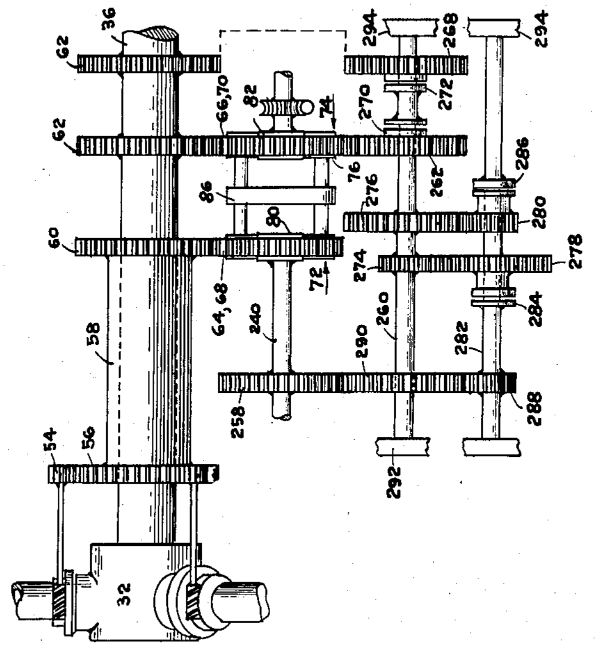
Fig. 12 is a schematic diagram of another gear train modification, laid out in a plane.
Figure 11:
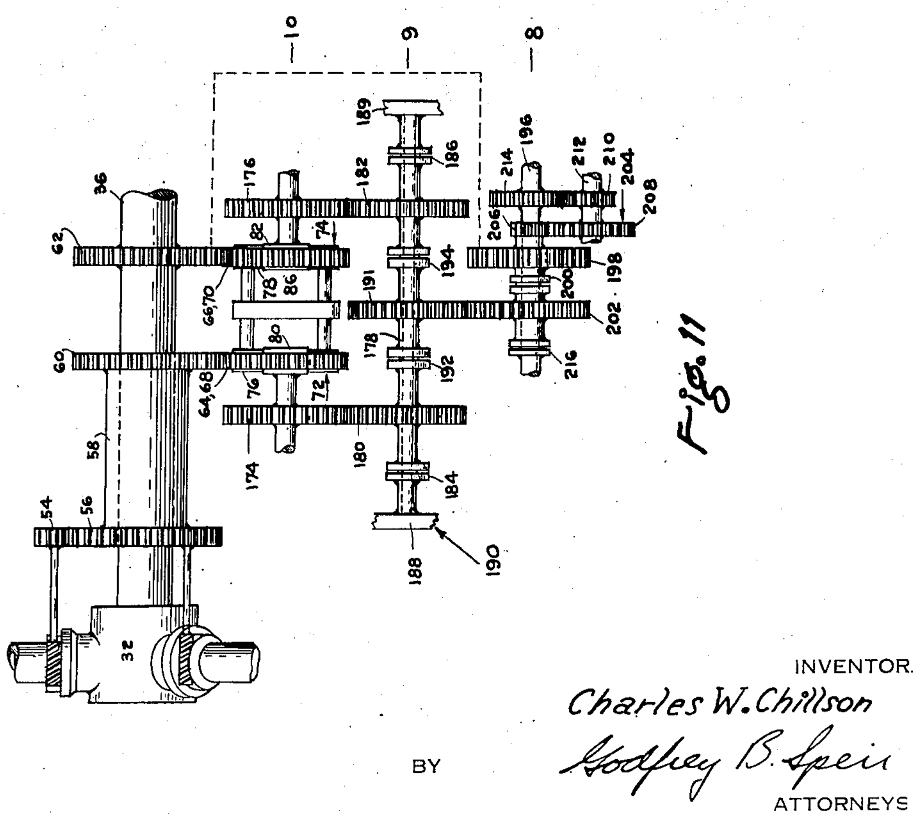
Fig. 11 is a schematic diagram of the gear trains of the modification of Figs. 5–10, laid out in a plane.

In the modification shown in Fig. 12, the same general principles are employed as in the previous modifications except that the gears are so arranged that pitch is retained fixed by simultaneous clutching of the high and low speed gear trains, to lock them against rotation. This train would be arranged in a housing embracing the propeller shaft in the same fashion as the other modifications described, and is shown only as a schematic diagram since structural arrangements would be of the same character as in the other embodiments. As shown, the drive shaft 36 has keyed thereto a pair of power gears 62 and the pitch changing gear sleeve 58, adapted to be fixed against relative rotation between it and the shaft 36 to fix pitch, or to be relatively rotated in one direction or the other to effect changes in pitch. Double planetary gear trains 72 and 74 are arranged coaxially with a lay shaft 240. The internal gear 70 of the planetary gear train 74 is provided with external gear teeth in mesh with one power gear 62. The internal gear 68 of the planet gear train 72 is provided with external gear teeth 64 which mesh with the gear 60 formed integrally with the sleeve 58. As previously, the planet gears 76 and 78 of the two planetary gear trains are freely rotatable relative to one another but are carried on a common spider 86. The sun gear 82 is secured against rotation, while the sun gear 80 is secured for rotation with a gear 258 mounted on the shaft 240. The gear 82 may be driven by an electric motor in a manner described previously, to allow blade pitch change when the power shaft 36 is not operating.

On an adjacent rotatable lay shaft 260 are arranged two freely rotatable gears 262 and 268, the former meshing with the external teeth 66 of the planetary 74 while the gear 268 is meshed directly with the power gear 62. Thus it will be seen that gears 262 and 268 rotate in opposite directions at the same speed so long as the propeller shaft and the power gear rotate. Through hydraulic clutches 270 and 272, either gear 262 or 268 may be clutched to the shaft 260 so as to drive the shaft selectively in either direction. Keyed to the shaft 260, are a pinion 274 and gear 276 which in turn mesh with a gear 278 and a pinion 280, rotatably mounted upon a third rotatable lay shaft 282. By means of clutches 284 and 286 either gear 278 or pinion 280 may be clutched to the shaft 282 so as to drive a pinion 288 secured to the shaft 282 and in mesh with an idler gear 290 freely mounted on shaft 260, the idler gear driving gear 258 of shaft 240 and consequently the sun gear 80. By actuating either clutch 270 or 272 depending on whether a pitch increase or decrease is desired and upon the actuation of either clutch 284 or 286 depending upon whether a fast or slow rate of pitch change is desired, the sun gear 80 will be rotated in one direction or the other at one of two rates of speed, which in turn will drive the pitch changing sleeve 58 in one direction or the other relative to the propeller shaft 230.

If it is desired to merely fix the pitch, both of the clutches 270 and 272 will be released while both clutches 286 and 284 will be simultaneously engaged. Thus the gear 278 meshed with the pinion 274 and the pinion 280 meshed with the gear 276 will effectally lock the shaft 282 and pinion 288 against rotation and thereby fix the sun gear 80 against rotation. Under these circumstances, no pitch change can occur. As in the previous modifications, the lay shafts 240, 260 and 282 are supported in bearings in end plates 292 and 294 of the gear housing, and provision is made in the shafts 260 and 282 and their bearings to provide pressure operating fluid to the various fluid clutches.

Figure 13:
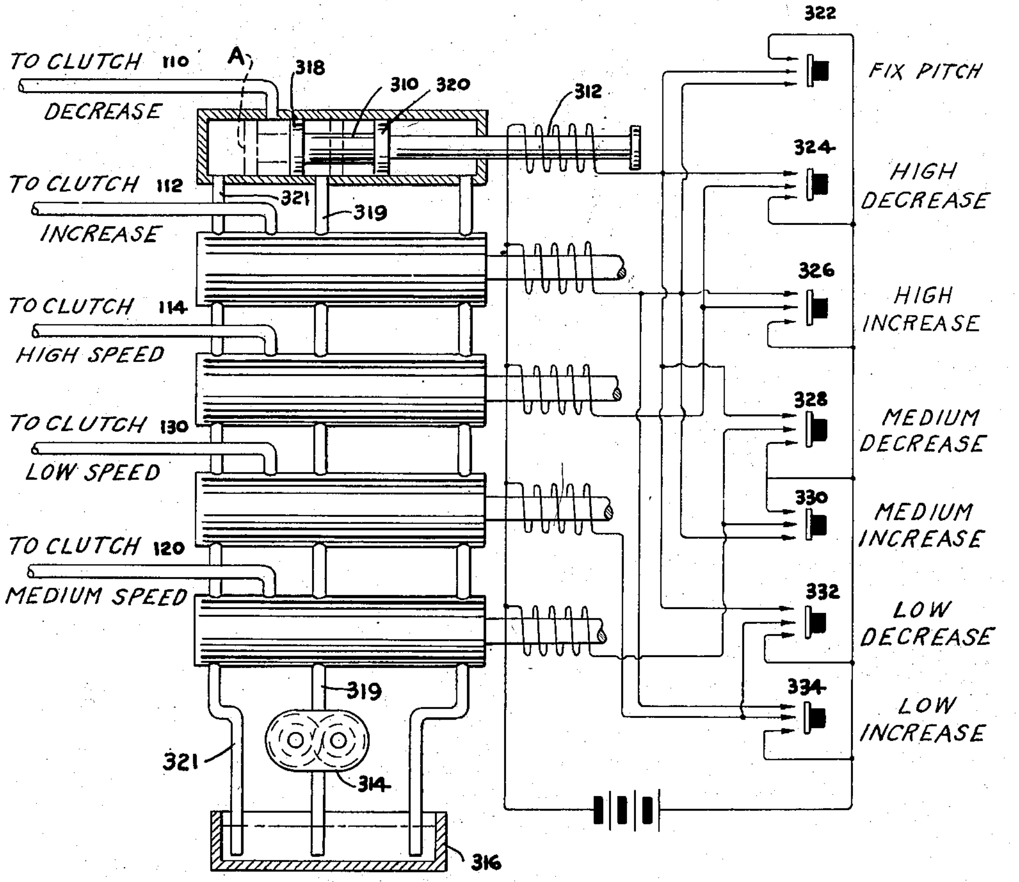
Fig. 13 is a control diagram applicable to the modification shown in Figs. 1–4 inclusive.
Figure 14:
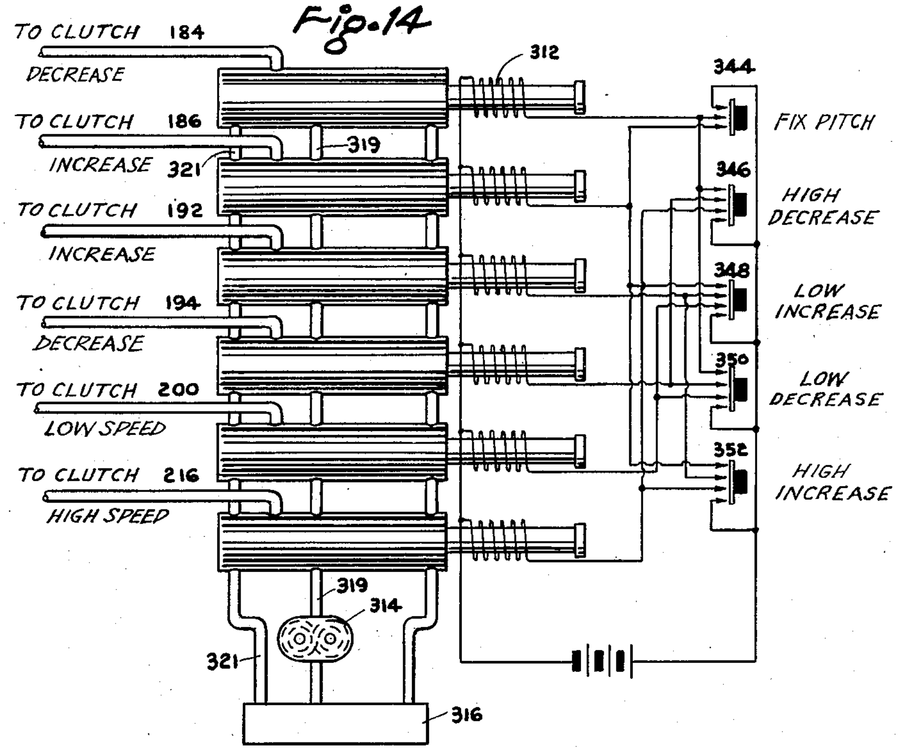
Fig. 14 is a control diagram applicable to the modification of Figs. 5–11 inclusive.
Figure 15:
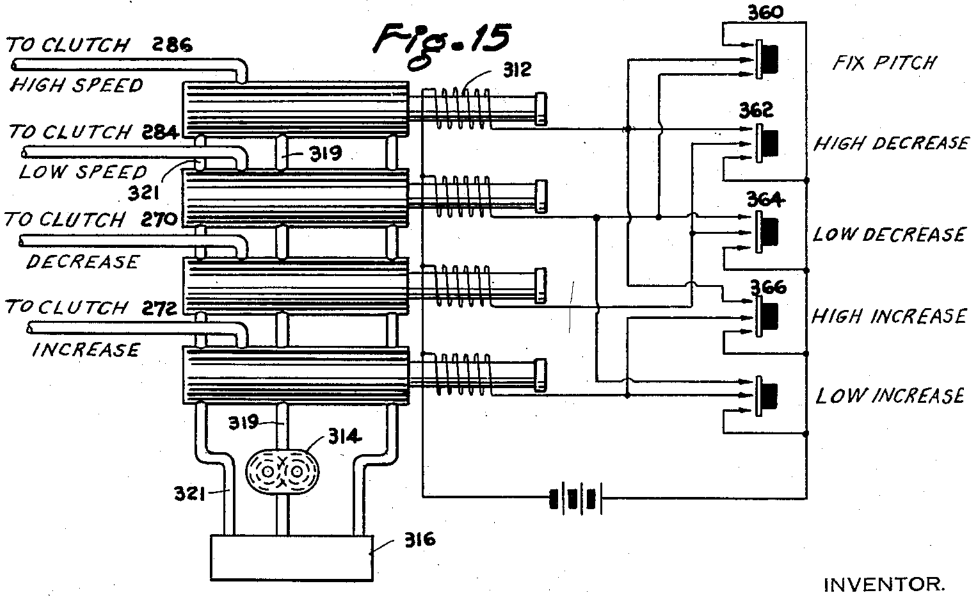
Fig. 15 is a control diagram applicable to the modification of Fig. 12.

Control over the clutches shown in the three described modifications may be effected by systems such as are shown in Figs. 13, 14 and 15. As shown in Fig. 13 wherein a control system for the modification of Figs. 1-4 appears, electromagnetically operated fluid valves are provided, one for each of the clutches 110, 112, 114, 120 and 130. Each valve is provided with a balanced piston 310 actuated by a solenoid 312. Fluid under pressure is supplied from a gear pump 314 deriving fluid from a sump 316, the fluid being introduced into the valve casings between the piston ends 318 and 320 of each of the balanced valves 310 through a conduit 319. By shifting any valve to the position shown at A, the pressure fluid is immediately fed to a conduit leading to the selected clutch. Upon return of the valve to its inactive (full line) position, the clutch pressure is relieved through a conduit 321 and the fluid is returned to the sump. Since it is necessary to actuate two clutches simultaneously to effect no pitch change or pitch increase or decrease at one of the three speeds provided, manual contactors are provided to effect closure of the proper solenoid circuits for each possible selection. The contactor 322 simultaneously actuates clutches 110 and 112 to fix propeller pitch. Contactors 324, 328 and 332 each actuate simultaneously clutch 110 and one of the clutches 114, 120 or 130 depending on whether high, medium or low speed pitch decrease is desired (it being assumed that clutch 110 causes rotation in a decrease pitch direction and clutch 112 in a pitch increase direction). Similarly, contactors 326, 330 and 334 simultaneously actuate clutch 112 and one of clutches 114, 120 or 130 to provide any one of the three speeds of pitch increase. It will be understood that any form of interlock may be employed in order to prevent the actuation of more than one contactor at any one time, in order to safeguard the apparatus against any possible jamming.

In Fig. 14, six valves are employed for actuating the clutches 184, 192, 194, 186, 200 and 216 of the modification shown in Figs. 5 through 11. In this modification, for fixing the pitch, the clutches 186 and 184 require simultaneous actuation. For varying the pitch, a combination of three clutches must be actuated simultaneously. It is assumed that clutches 184 and 194 operate to effect pitch decrease, and 186 and 192 operate to effect pitch increase. Contactor 344 actuates clutches 184 and 186 simultaneously to fix pitch. Contactor 346 actuates clutches 184, 194 and 216 to provide rapid pitch decrease. Contactor 348 actuates clutches 186, 192, and 200 to increase pitch at low speed. Contactor 350 actuates clutches 184, 194 and 200 to effect a low rate of pitch decrease and contactor 352 actuates clutches 186, 192 and 216 to provide a high rate of pitch increase.

In Fig. 15 a four valve arrangement is shown for actuating the clutches 270, 272, 284, and 286 of the modification shown in Fig. 12. In this arrangement, pitch is fixed by actuating clutches 284 and 286 simultaneously by means of contactor 360. Clutch 286 in combination with clutch 270, actuated by contactor 362 effects a high rate of pitch decrease. Contactor 364 actuates clutches 270 and 284 resulting in a low rate of pitch decrease. Contactor 366 actuates clutches 286 and 272 resulting in a high rate of pitch increase. Contactor 368 simultaneously actuates clutches 272 and 284 to effect a low rate of pitch increase.

It should be understood that the switch units 322—334, 344—352 and 360—366 in a propeller installation would be operated by automatic control devices such as regulators or governors, as well as by manual selection at times. Also, limit switches to limit high and low governed pitch, feathering and reverse pitch would be embodied in the propeller, these devices being arranged to cooperate with manual and automatic controls to coordinate propeller operation within the several regimes of operation which are desired.

Though several embodiments illustrating the invention have been shown and described, it is to be understood that the invention may be applied in other and various forms. Changes may be made in the arrangements, without departing from the spirit of the invention. Reference should be had to the appended claims for definitions of the limits of the invention.

What is claimed is:

1. In a variable pitch propeller, a hub, blades swivelled therein for pitch change, a drive shaft, a sleeve on said drive shaft, means responsive to the relative rotation between said sleeve and shaft for effecting pitch change, a pair of planetary gear trains each having coaxial gears and planet gears interposed and having a common planet carrier, a coaxial gear of each planetary geared to said sleeve and shaft respectively, means for fixing one of the remaining coaxial gears, and means for holding, or driving the other remaining coaxial gear at different speeds and in different directions to fix, or increase or decrease pitch at different speeds, said means for driving the other gear including means for deriving driving torque from the drive shaft at three different speeds and in either direction.

2. In a variable pitch propeller, a hub, blades swivelled therein for pitch change, a drive shaft, a sleeve on said drive shaft, means responsive to the relative rotation between said sleeve and shaft for effecting pitch change, a pair of planetary gear trains each having coaxial gears and planet gears interposed and having a common planet carrier, a coaxial gear of each planetary geared to said sleeve and shaft respectively, means for fixing one of the remaining coaxial gears, and means for holding, or driving the other remaining coaxial gear at different speeds and in different directions to fix, or increase or decrease pitch at different speeds, said means for driving the other gear including means for deriving driving torque from the shaft at two different speeds and in either direction.

3. In a variable pitch propeller, a hub, blades swivelled therein for pitch change, a drive shaft, a sleeve on said drive shaft, means responsive to the relative rotation between said sleeve and shaft for effecting pitch change, a pair of planetary gear trains laterally spaced with respect to the shaft axis each having coaxial gears and planet gears interposed and planet carrier means for said planet gears, means for pairing an element of each of said planetary gear trains for concomitant rotation, means for gearing two elements of said planetary gear trains to said sleeve and shaft respectively, means for fixing one of the remaining elements, and means for holding, or driving the other remaining element at different speeds and in different directions to fix, or increase or decrease pitch at different speeds, said means for driving the other element including means for deriving driving torque from the drive shaft at three different speeds and in either direction.

4. In a variable pitch propeller, a propeller shaft, a hub, blades swivelled in said hub for pitch variation, a sleeve around said shaft and adapted for relative rotation, means interposed between said sleeve and blades for effecting changes of pitch upon rotation of said sleeve relative to said shaft, a plurality of lay shafts arranged about said propeller shaft, planetary gear trains on one of said lay shafts, geared to said sleeve and said propeller shaft, and gearing on the remaining lay shafts for coupling an element of one of said planetaries to said propeller shaft for deriving power therefrom, said gearing having means for providing two directions of motion of said element at a plurality of speeds.

5. In a variable pitch propeller, a propeller shaft, a hub, blades swivelled in said hub for pitch variation, a sleeve around said shaft and adapted for relative rotation, means interposed between said sleeve and blades for effecting changes of pitch upon rotation of said sleeve relative to said shaft, a plurality of lay shafts arranged about said propeller shaft, planetary gear trains on one of said lay shafts, geared to said sleeve and said propeller shaft, gearing on the remaining lay shafts for coupling an element of one of said planetaries to said propeller shaft for deriving power therefrom, said gearing having means for providing two directions of motion of said element at a plurality of speeds, means for uncoupling said gearing from said propeller shaft, and means for locking said gearing against rotation by actuating simultaneously said means for providing motion at two different speeds.

6. In a variable pitch propeller, a hub, blades swivelled therein for pitch change, a drive shaft, a sleeve on said drive shaft, means responsive to the relative rotation between said sleeve and shaft for effecting pitch change, a pair of planetary gear trains each having coaxial gears and planet gears interposed and having a common planet carrier, a coaxial gear of each planetary geared to said sleeve and shaft respectively, means for fixing one of the remaining coaxial gears, and means for holding, or driving the other remaining coaxial gear in either direction to fix, or increase or decrease pitch, said means for driving the other gear including means for deriving driving power from the drive shaft.

CHARLES W. CHILLSON.

REFERENCES CITED

The following references are of record in the file of this patent:

UNITED STATES PATENTS

| Number | Name | Date |
|---|---|---|
| 2,314,025 | Waseige | Mar. 16, 1943 |
| 2,370,675 | McCoy | Mar. 6, 1945 |
| 2,437,188 | Forsyth | Mar. 2, 1948 |
| 2,455,000 | Forsyth | Nov. 30, 1948 |

FOREIGN PATENTS

| Number | Country | Date |
|---|---|---|
| 840,491 | France | Jan. 16, 1939 |